Jan. 31, 1967 K. D. BARTLEY ET AL 3,300,917

TELEPHONE SHELF UNIT

Filed Oct. 26, 1964 4 Sheets-Sheet 1

INVENTORS: K. D. BARTLEY
R. E. PRESCOTT

BY E J Olinder

ATTORNEY

Jan. 31, 1967 K. D. BARTLEY ET AL 3,300,917

TELEPHONE SHELF UNIT

Filed Oct. 26, 1964 4 Sheets-Sheet 2

Jan. 31, 1967 K. D. BARTLEY ET AL 3,300,917

TELEPHONE SHELF UNIT

Filed Oct. 26, 1964 4 Sheets-Sheet 3

Jan. 31, 1967 K. D. BARTLEY ET AL 3,300,917

TELEPHONE SHELF UNIT

Filed Oct. 26, 1964 4 Sheets-Sheet 4

United States Patent Office 3,300,917

Patented Jan. 31, 1967

3,300,917

TELEPHONE SHELF UNIT

Keith D. Bartley, Indianapolis, Ind., and Robert E. Prescott, Rumson, N.J., assignors to Bell Telephone Laboratories, Incorporated, New York, N.Y., a corporation of New York Filed Oct. 26, 1964, Ser. No. 406,468

10 Claims. (Cl. 52—36)

This invention relates to public telephone installations and more particularly to multiple partition and shelf assemblies for pay station telephones.

Partition and shelf assemblies for public pay telephone station have replaced conventional telephone booths in many areas because of the obvious advantages in terms of reduced installation and maintenance costs and in terms of the significant saving in space that results. These advantages and other potential advantages have not been fully exploited by telephone shelf and partition assemblies known heretofore, however, inasmuch as such assemblies lack sufficient flexibility to be adapted readily to different environmental conditions such as surrounding decor. It is desirable, for example, to be able to install paneling material suitably related to the surroundings of a particular installation without requiring complete disassembly of the shelf unit. Known installations lack such a capability.

Accordingly, one object of the invention is to enhance the versatility of partition and shelf assemblies for coin telephones.

Another object is to simplify the assembly and disassembly of coin telephone shelf installations.

An adidtional object is to reduce the cost of coin telephone shelf installations.

These and other objects are achieved in accordance with the principles of the invention by a unique combination of multifunction frame and support members together with readily removable back and side panels. More specifically, a coin telephone shelf installation in accordance with the invention utilizes a base member comprising a section of plywood or the like that is suitably affixed to a wall or similar support at the site of the installation. Four frame members or rails are suitably interconnected and affixed to the base to form a rectangular frame. In the center of the frame a metallic telephone support plate is affixed to the base. Each of the side edges of the plate is grooved or slotted and the top of the plate is slidably accommodated by a groove or slot on the inner edge of the top frame member.

Each of a pair of multifunction vertical molding strips is affixed to a respective one of the vertical side rails. A slot is formed thereby between each side rail and a respective one of the vertical molding strips to slidably accommodate the vertical inner edge of a side panel or wing. Additionally, each vertical molding strip is slotted to accommodate the outer vertical edge of a respective one of a pair of rear panel members, the inner vertical edge of each being accommodated by the previously mentioned slots of the telephone support plate. The top edge of each of the rear panels is accommodated by the previously mentioned top rail slot.

Further, in accordance with the principles of the invention, a pair of brackets, affixed to the base, is employed to support a front shelf support bar and a pair of side shelf support bars that form a frame for a slidably mounted shelf. Each of a pair of horizontal multifunction molding, shelf support and side panel clamping strips is mounted for lateral adjustment on a respective one of the side shelf support bars. The shelf is slidably accommodated and supported by the horizontal molding strips and the innermost edge of the shelf is positioned under the lower edge of the rear panels thereby providing the sole vertical support for these panels.

The side or wing panels are held in place by U-shaped grooved rails, each end of which is affixed to a vertical frame rail by a single fastener. The underportion of the outer lip of the shelf is held in place by simple fasteners. Consequently, in accordance with the invention, all of the panels may be changed with a minimum of disassembly operations.

Accordingly, one feature of the invention is a shelf and panel coin telephone installation in which the side and rear panels may be removed and replacement panels installed with little or no disassembly of further portions of the installation.

Another feature of the invention is a shelf and panel coin telephone installation utilizing multifunction, adjustably positioned molding strips that serve as decorative moldings, as guide channels for a slidably mounted shelf and as clamping devices for holding the side panels firmly in position.

An additional feature of the invention is a shelf and panel coin telephone assembly having a slidably mounted shelf member that provides the sole vertical support for slidably mounted rear panel members.

The principles of the invention and additional objects and features thereof will be fully apprehended from the following detailed description of an illustrative embodiment and from the appended drawing in which.

Figure 1:
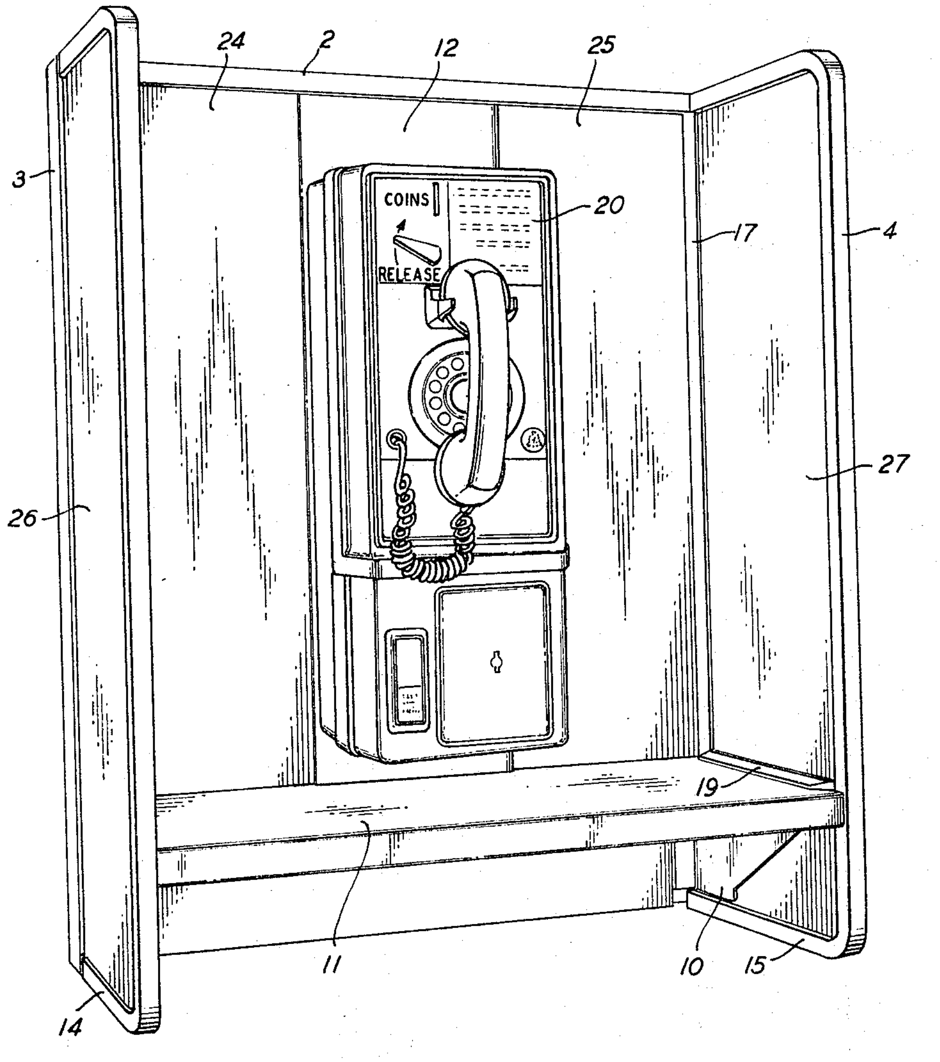
FIG. 1 is a front perspective view of a panel and shelf coin telephone in accordance with the invention.

FIG. 1 shows the finished assembly of a coin telephone panel and shelf installation in accordance with the invention. From the standpoint of appearance, the principles of the invention permit the construction of an installation that is marked both by simplicity and by uniquely attractive styling. The rear panels 24 and 25 and side panels 26 and 27 are typically formed of some suitable material to provide a proper relation in both color and texture with the surrounding decor. Thus, for example, the panels 24 through 27 may be formed from decorative wood paneling, vinyl, Fiberglas, plastic or any one of a wide variety of similar materials. The shelf 11 may be of either aluminum or stainless steel, for example, in order to ensure a relatively impervious yet attractive surface. Telephone mounting plate 12, as well as the various framing and support members such as top rail 2, left rail 3, curved column members 14 and 15, right vertical molding strip 17 and right shelf guide 19, are typically formed of extruded aluminum to ensure low cost, light weight, adequate strength and attractive appearance.

Figure 2:
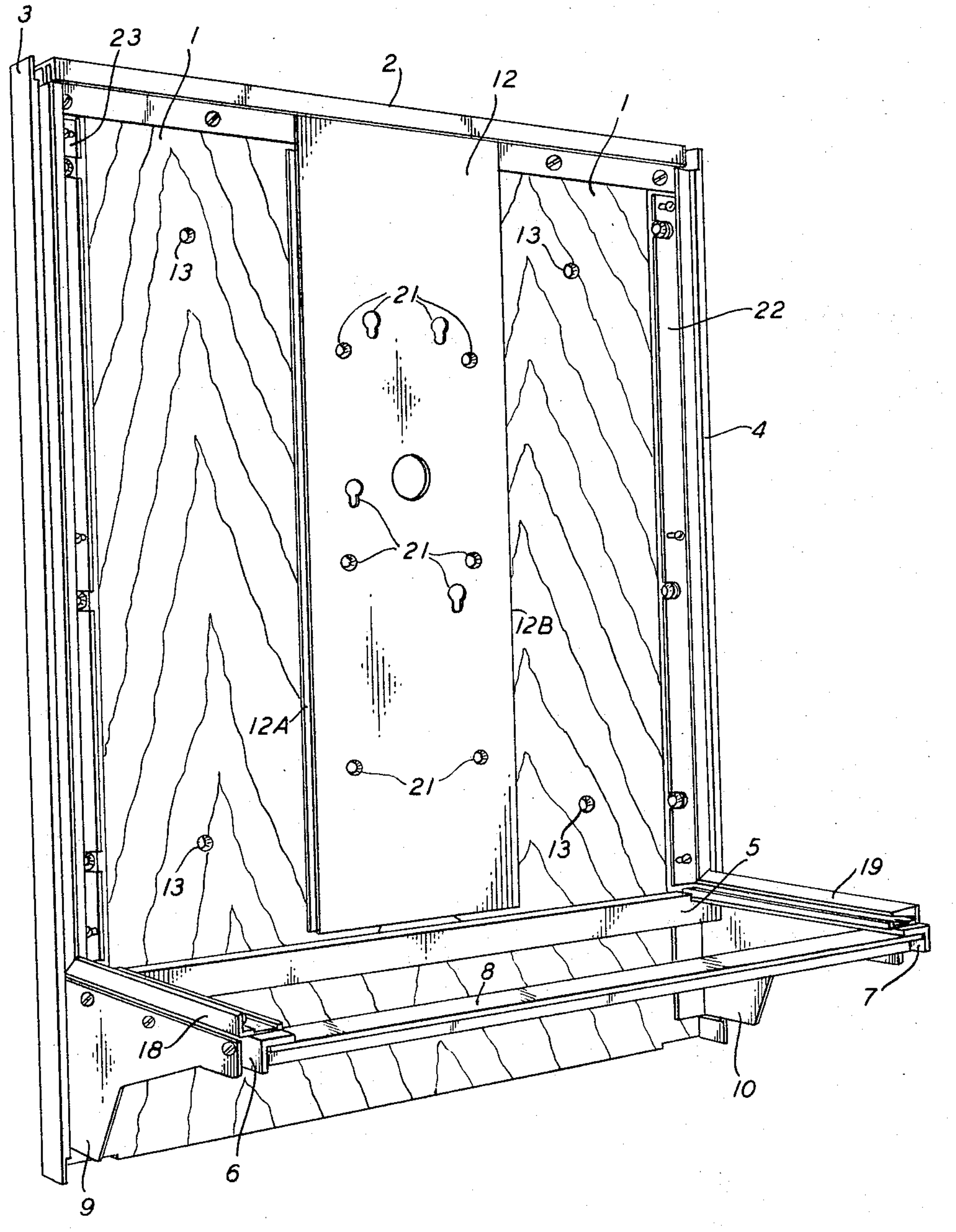
FIG. 2 is a front perspective view of the mounting board, telephone mounting member and frame members employed in the installation shown in FIG. 1.

The basic structure of the various framing and support members is best illustrated in FIG. 2. The backboard member 1, advantageously a heavy plywood sheet, is utilized, in accordance with the invention, to ensure a relatively smooth and uniform mounting surface irrespective of irregularities in the wall or other structure employed to support the installation. Apertures 13 are provided to accommodate suitable fasteners to affix backboard 1 to a wall or other available support structure. A substantially rectangular vertically disposed frame is formed by top rail 2, left rail 3, right rail 4 and bottom rail 5. Each of the indicated rail members is suitably affixed to backboard 1 by the fasteners indicated.

Top rail 2 is slotted on its underside to accommodate the upper, outer edge of telephone mounting plate 12. Mounting plate 12 is provided with a group of apertures 21 to accommodate various combinations of telephone leads and fastening devices. Mounting plate 12 further includes side slots or grooves 12A and 12B. Also affixed to backboard 1 are brackets 9 and 10 which provide basic support strength for shelf 11, shown in FIGS. 1 and 3. Left and right shelf support bars 6 and 7 are suitably affixed to brackets 9 and 10, respectively, and together with front shelf support bar 8 provide the necessary frame for shelf 11.

Figure 8:
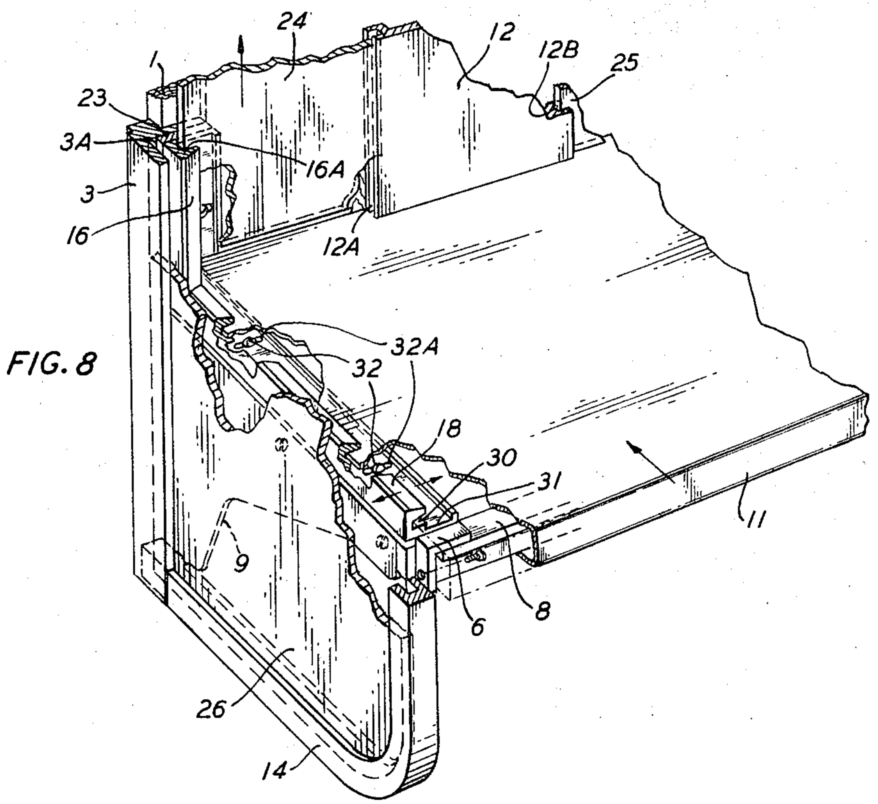
FIG. 8 is a partially cut-away, partially cross-section perspective view of the left front corner of the assembly shown in FIG. 1.

Left and right shelf guide members 18 and 19, best seen in FIGS. 2 and 8, uniquely provide a combination of functions in that each is provided with a slot or groove 30 which slidably accommodates shelf 11. Further, shelf guides 18 and 19 form attractive and protective molding strips between side panels 26 and 27 and shelf 11. Additionally, shelf guides 18 and 19 provide a means for clamping side panels 26 and 27 in their respective curved column supports 13 and 15. More specifically, shelf guides 18 and 19 are affixed to left and right shelf support bars 6 and 7, respectively, by fasteners 32, FIG. 8, which are accommodated by elongated slots 32A. Accordingly, shelf guides 18 and 19 are laterally adjustable in order to provide the side panel clamping function indicated above.

Figure 3:
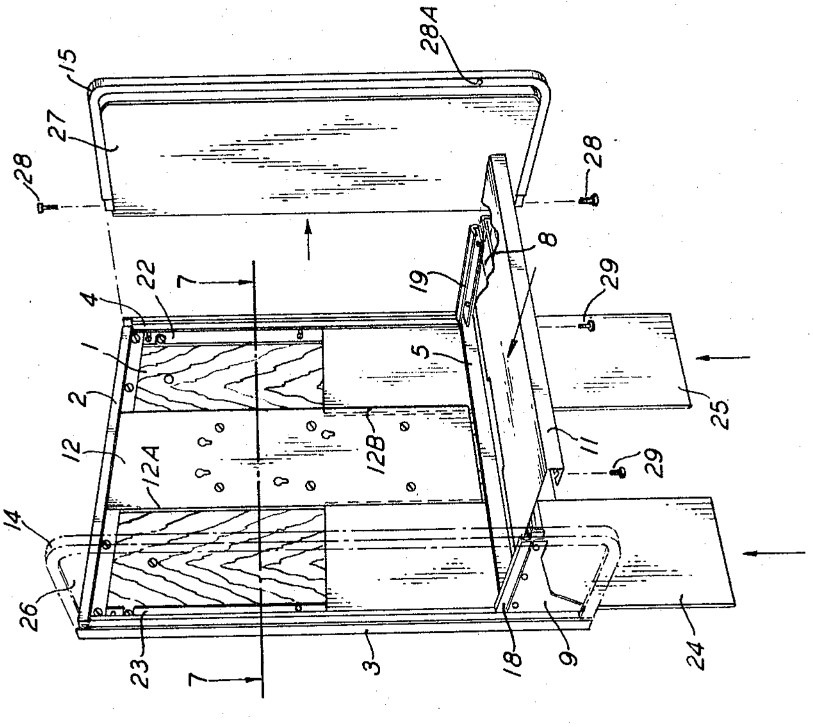
FIG. 3 is a partially exploded and partially cut-away view of the arrangement shown in FIG. 2 with the addition of side and rear panels and a shelf.
Figure 5:
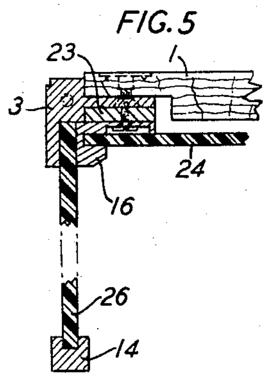
FIG. 5 is a partial cross-section view of the arrangement shown in FIG. 4 taken along the line 4—4.

Each of the side panels 26 and 27 is slidably mounted, as indicated above, in a respective one of the curved column members 14 and 15. A suitable aperture is provided at the top and at the bottom of right rail member 4, as shown in FIGS. 2 and 8, to accommodate the narrowed ends of curved column 15. Column 15 is held in place in the position indicated by fasteners 28, as shown in FIG. 3. Left column 14, together with left side panel 26, is similarly supported and secured in left rail 3. Additional rigidity of side panels 26 and 27 is provided by multiple function left and right vertical molding strips 16 and 17. Molding strips 16 and 17, which are fastened to backboard 1 and to left rail member 3 and right rail member 4, respectively, force side panels 26 and 27 against the forwardly extending lip of left and right rails 3 and 4, respectively. Further, molding strips 16 and 17 serve as protective and decorative moldings between the respective rear and side panels. Additionally, left vertical molding strip 16 is slotted to accommodate the left edge of the left rear panel 24 and, similarly, right vertical molding strip 17 is slotted to accommodate the right edge of the right rear panel 25. As indicated above, the right edge of panel 24 and the left edge of panel 25 are similarly slidably accommodated by edge grooves 12A and 12B of mounting plate 12. It is evident, therefore, that, in accordance with the invention, considerable economy in construction is achieved in that virtually all of the edges of the various panel members are fully hidden and protected by accommodating slots or by molding and consequently these edges do not require expensive finishing or other special treatment.

Figure 7:
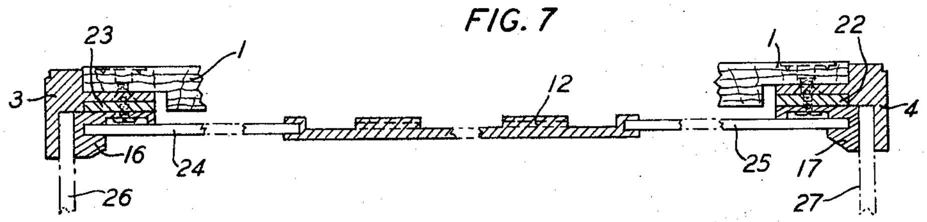
FIG. 7 is a cross-section of the arrangement shown in FIG. 3 taken along the line 7—7.

Additional rigidity and strength is provided for the assembly as a whole by left and right spacer strips 22 and 23, shown in FIG. 2. These strips, which may be formed of steel, for example, occupy the space between the inwardly extending projections of left and right rails 3 and 4 and the associated left and right vertical molding strips 16 and 17, as shown in FIG. 7.

As indicated above, the facility with which the installation may be assembled and disassembled constitutes a particular feature of the invention. Such a feature is highly desirable inasmuch as it is often necessary to renew or change the side and rear panels in order to replace damaged panels or in order to provide a more suitable match with the surrounding decor. One of the key structural arrangements which contributes to the function indicated is the utilization of shelf 11, which is slidably mounted as shown most clearly in FIG. 3, to provide the sole vertical support for left and right rear panels 24 and 25. As a result, the removal of the fasteners 29 is all that is required to free shelf 11 for outward sliding movement at which point panels 24 and 25 are free to drop clear from their accommodating slots. Another key arrangement contributing to the aforementioned feature of ease of assembly and disassembly resides in the previously described means by which the side panels 26 and 27 are secured. The simple removing of three fasteners 28 and 28A permits side panel 27, for example, to be withdrawn, together with its accommodating curved column 15. At that point, side panel 27 may readily be removed from curved column 15 and a replacement panel inserted.

Figure 4:
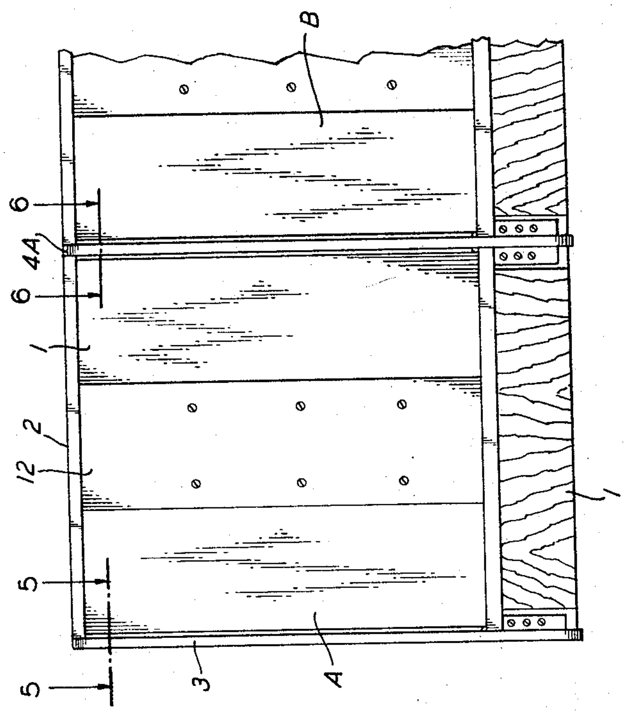
FIG. 4 is a front elevation view of a part of a multiple installation in accordance with the invention.
Figure 6:
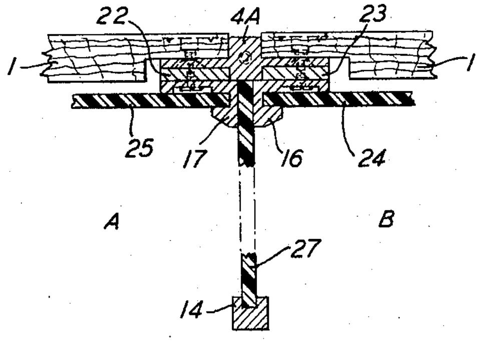
FIG. 6 is a partial cross-section view of the arrangement shown in FIG. 4 taken along the line 6—6.

The principles of the invention afford a ready means for providing multiple telephone shelf and panel assemblies. Construction details of a multiple arrangement are shown in FIGS. 4 and 6. In FIG. 4, shelf and panel coin telephone assembly A is shown with a similar adjacent assembly B. In lieu of standard left and right rail members 3 and 4, as shown in FIG. 3, installations A and B share a common vertical rail 4A which is T-shaped in cross section as shown in FIG. 6. As a result, right side panel 27 of installation A also serves as the left side panel of installation B. The inner edge of common panel 27 is gripped in place by vertical molding strips 16 and 17, each of which is suitably affixed to the common vertical rail member 4A.

It is to be understood that the embodiment described herein is merely illustrative of the principles of the invention. Various modifications may be made by persons skilled in the art without departing from the spirit and scope of the invention.

What is claimed is:

1. A telephone shelf assembly unit comprising, in combination, a pair of side panel members, a pair of back panel members, a dual purpose telephone mounting member having a grooved portion on opposing vertical boundaries thereof each slidably accommodating a first vertical edge of a respective one of said back panel members, first multifunction means for slidably accommodating the second vertical edge of each of said back panel members, for providing molding between said side panel members and said back panel members and for clamping in place a vertical edge of each of said side panel members, and a slidably mounted shelf member providing the sole vertical support for said back panel members.

2. Apparatus in accordance with claim 1 including second multifunction means for slidably accommodating an opposing pair of edges of said shelf, for providing a lateral clamping force against said side panel members and for providing molding between said side panels and said shelf.

3. A telephone shelf assembly unit comprising, in combination, a central substantially rectangular vertically positioned telephone mounting plate member having a pair of vertical boundaries and a pair of horizontal boundaries, a pair of vertically disposed side panel members each having a pair of vertical edges and a pair of horizontal edges, a pair of vertically disposed back panel members each having a pair of vertical edges and a pair of horizontal edges, said plate member having a pair of grooves each along one of said vertical boundaries, each of said grooves slidably accommodating a first vertical edge of a respective one of said back panel members, a first and a second outer frame and molding member each slidably fitted on one of said vertical edges and on said horizontal edges of a respective one of said side panel members, first and second vertically disposed molding members each grooved to accommodate one of the vertical edges of a respective one of said back panel members and disposed to provide a clamping force against a vertical edge of a respective one of said side panel members, first and second horizontally disposed molding members each laterally adjustable to provide a clamping force against a respective one of said side panel members, and a horizontally disposed shelf member slidably engageable by each of said horizontally disposed molding members, said shelf member providing the sole vertical support for said back panel members.

4. A telephone shelf assembly unit in accordance with claim 3, including a pair of supporting brackets, a horizontally disposed frame supported by said brackets, said last named frame providing support means for said horizontally disposed molding members and a vertically disposed frame having one portion thereof in common with said horizontally disposed frame.

5. Apparatus in accordance with claim 4 including means affixing each of the ends of said outer frame members to a respective portion of said vertically disposed frame.

6. A telephone shelf assembly unit comprising, in combination, a vertically disposed mounting board, a vertically disposed frame including a pair of horizontal bar members each affixed to a pair of grooved vertical bar members, each of said bar members being affixed to said mounting board, a telephone mounting panel secured to said board, said panel including a pair of vertically disposed edge grooves, a pair of bracket members each affixed to a respective one of said vertical bar members, a horizontally disposed frame supported by said bracket members, said last named frame comprising a first pair of rail supports and a second pair of rail supports, one of said first pair of supports being the lower one of said horizontal bar members, a pair of vertically disposed back panel members each having a pair of vertical edges and a pair of horizontal edges, one of said edges in each of said pairs of edges being slidably accommodated by a respective one of said grooves, a pair of vertically disposed substantially rectangular side panel members, a pair of edge rails each grooved to accommodate three sides of a respective one of said panels, the fourth side of each of said side panels being accommodated by a respective one of grooved vertical bar members, and a shelf member having one edge thereof slidably mounted under the lower one of each of said horizontal edges of said back panel members thereby providing the sole vertical support for said back panel members.

7. Apparatus in accordance with claim 6 including a pair of dual purpose horizontal molding strips each grooved to accommodate a respective side edge of said shelf, each of said strips providing a molding function between a respective one of said side panel members and said shelf and each including means for laterally adjusting its position with respect to a respective one of said second pair of rail supports thereby enabling an adjustment of the clamping force between each of said strips and a respective one of said side panel members.

8. A telephone shelf assembly unit comprising, in combination, a mounting board, a telephone mounting panel having grooves on each vertical edge thereof, said panel being affixed to said board, a pair of vertical frame members and a pair of horizontal frame members affixed to said mounting board and interconnected to form a substantially rectangular frame, the upper one of said of horizontal frame members and each of said vertical frame members including a respective groove on the edge of said frame, said groove of said upper frame member accommodating the upper horizontal edge of said mounting panel, a pair of back panel members each slidably mounted in a respective one of said grooves of said mounting panel and in said groove of said upper frame member, a pair of supporting brackets affixed to said mounting board, a horizontal frame supported by said brackets, a pair of side panel members mounted substantially perpendicularly to said back panel members, each of said side panel members being slidably mounted in a respective groove of one of said vertical frame members, a shelf member slidably mounted on said horizontal frame and under the bottom edge of both of said back panel members thereby providing the sole vertical support for said back panel members, whereby the replacement of said back panel members is facilitated.

9. Apparatus in accordance with claim 8 including a pair of grooved side rail supports each providing a frame and support for a respective one of said side panels, each of said supports being affixed to a respective one of said vertical frame members.

10. Apparatus in accordance with claim 8 including a first set of multifunction molding strips providing an accommodating slot for one edge of a respective one of said back panel members, providing molding means between said shelf and a respective one of said side panel members, and providing an adjustable clamping force positioning a respective one of said side panel members.

References Cited by the Examiner

UNITED STATES PATENTS

| | | | |
|---|---|---|---|
| 741,524 | 10/1903 | Miller | 52—506 |
| 3,110,934 | 11/1963 | Triplett | 108—60 |
| 3,164,868 | 1/1965 | Hannula | 52—36 |
| 3,247,332 | 4/1966 | McHugh | 52—36 X |

References Cited by the Applicant

UNITED STATES PATENTS

| | | |
|---|---|---|
| 2,427,012 | 9/1947 | Lum. |
| 3,110,934 | 11/1963 | Triplett. |

FRANK L. ABBOTT, *Primary Examiner.*

JOHN E. MURTAGH, *Examiner.*